Aug. 7, 1928.
G. A. M. LAMBLIN PARENT
1,680,154
VEHICLE HEADLIGHT
Filed Dec. 12, 1925   3 Sheets-Sheet 1
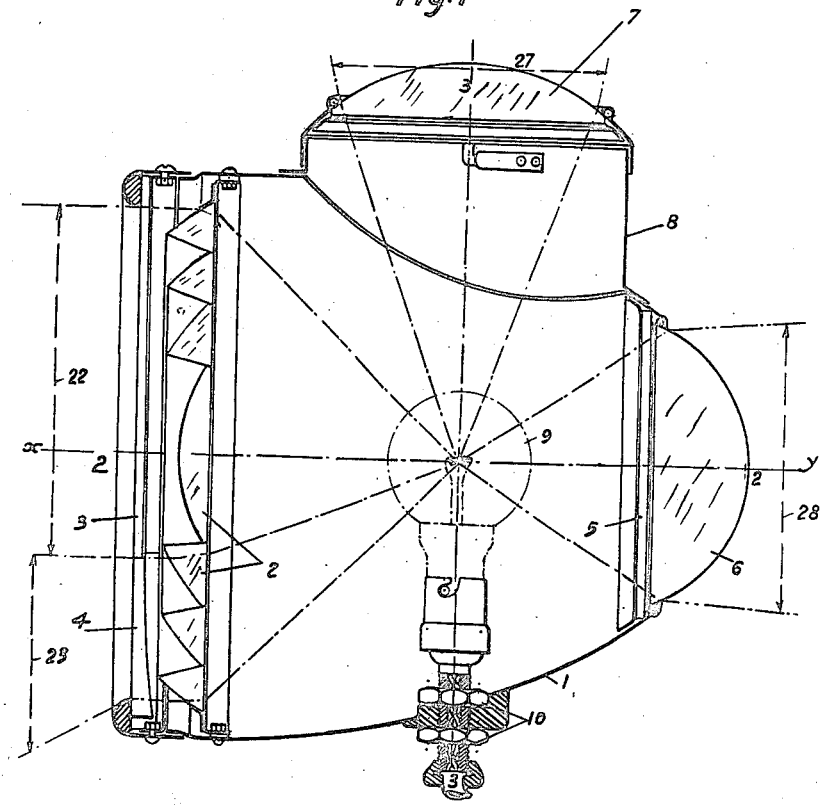
Gustave Alphonse Marie Lamblin-Parent
INVENTOR

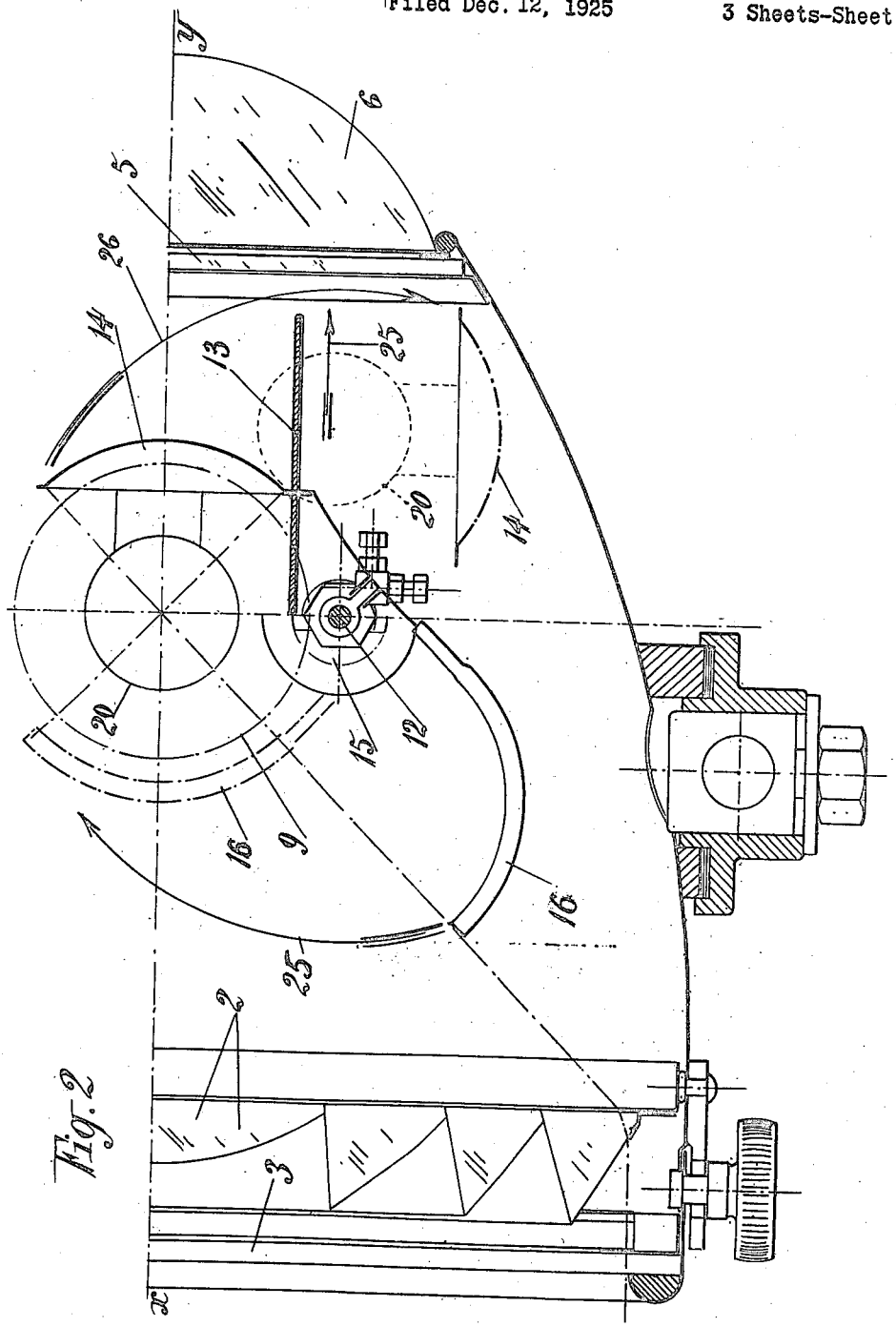

Aug. 7, 1928.
G. A. M. LAMBLIN PARENT
1,680,154
VEHICLE HEADLIGHT
Filed Dec. 12, 1925   3 Sheets-Sheet 3
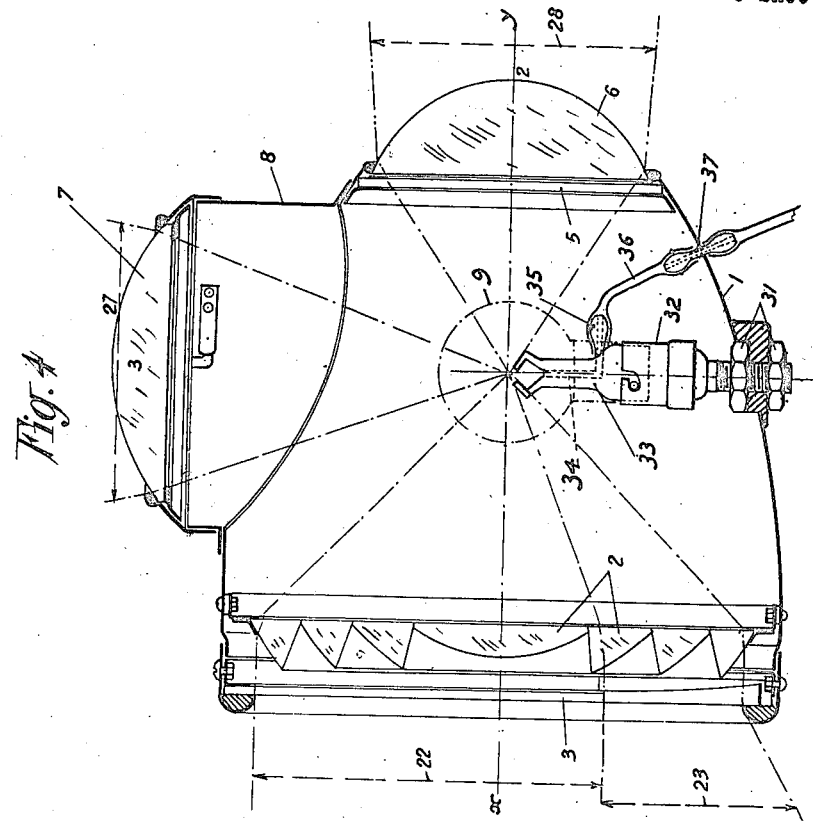
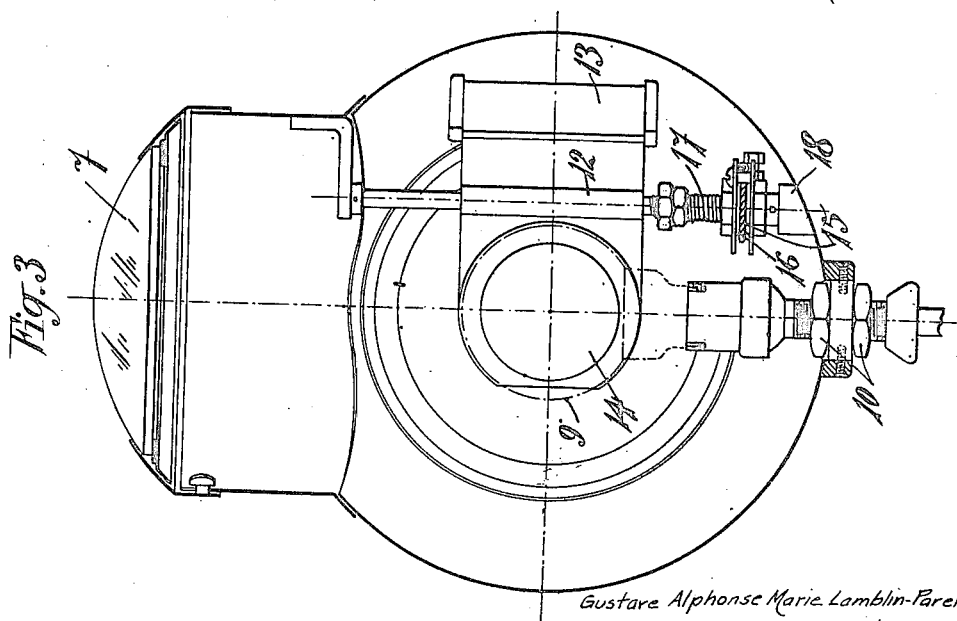
Gustave Alphonse Marie Lamblin-Parent
INVENTOR
his ATTY.

Patented Aug. 7, 1928.

1,680,154

UNITED STATES PATENT OFFICE

GUSTAVE ALPHONSE MARIE LAMBLIN PARENT, OF LILLE, FRANCE.

VEHICLE HEADLIGHT.

Application filed December 12, 1925, Serial No. 74,959, and in France April 7, 1925.

This invention relates to various improvements in head lamps or head lights for motor cars or other vehicles such as tramways, aircraft, etc. These improvements are more particularly intended to prevent such head lamps or lights from dazzling, and to enable them to give a warning to drivers of cars or other vehicles coming in the opposite direction or following behind.

A head lamp or light according to the invention is characterized by a coloured screen, for instance of green colour, this screen being controlled by the driver and brought in front of the source of light so as to intercept the whole or part of the beam of white light emitted by the said source, and to replace it by a beam of coloured light.

The invention covers also the combination of the coloured screen and of a reflector operated by the same mechanism as the said screen; in the normal position of travelling (when the vehicle is moving along an unobstructed path), the coloured screen is held away from the source of light and allows the beam of white light of this source to pass freely; this beam is further condensed and strengthened by the reflector; on the contrary, when the vehicle meets an obstacle, such as for instance another vehicle moving in the opposite direction, the driver actuates the control mechanism of the screen and of the reflector; the coloured screen is brought thereby in front of the source of light, intercepts the whole or part of the beam of white light of the said source, and replaces it by a beam of coloured light, whilst the reflector leaves free the rear part of the source of light and thus enables the said source to emit rearwards a beam of light coloured by a suitable glass or lens, this beam thus giving an indication to the following vehicles and lighting the road to be followed by the vehicle coming from the opposite direction.

The invention comprises also other characteristic features hereinafter described, and various combinations of the same.

Head lamps or head lights for motor cars or other vehicles according to the invention are illustrated by way of example in the accompanying drawings, in which:—

Figure 1 is an axial longitudinal section through a vertical plane of a head lamp according to the invention, Figure 2 is a horizontal half section of this head lamp on line 2—2 of Figure 1, Figure 3 is a vertical section of the said head lamp on line 3—3 of Figure 1, and Figure 4 is a longitudinal section of another head lamp according to the invention.

The head lamp or head light shown in Figures 1 to 3, comprises a casing 1, for instance having the shape of a paraboloid with an axis $x, y$. This casing is provided at its front portion with a Fresnel lens 2, in front of which is arranged a plate glass 3 with parallel faces. The lower portion of the said glass is replaced by a portion 4 of a concave or convex divergent lens, for the purpose hereinafter fully explained.

The casing 1 is provided at its rear part with a glass plate 5 coloured for instance red, and with a lens 6 of white glass which in its turn could be of red glass.

Finally another white glass or lens 7 is secured in an upper tubular branch 8 of the casing 1.

An electric lamp 9 is mounted in the interior of the casing 1 and secured to the said casing by means of nuts 10.

A vertical spindle 12 is rotatably mounted in the interior of the casing 1; this spindle carries a coloured screen 13 constituted for instance by a glass of green colour, and a concave reflector 14 surmounted by an opaque horizontal screen 20; the spindle 12 is secured to a pulley 15 on which is wound a flexible cable 16. A helical spring 17 is inserted between the spindle 12 and its fixed support 18.

The head lamp or head light described in the foregoing, works in the following manner: During normal running, that is to say when the vehicle is travelling along an unobstructed path, the helical spring 17 holds the screen 13 and the reflector 14 in the positions shown in full lines in Figure 2. Consequently, the beam of white light emitted by the lamp 9, passes through the Fresnel lens 2 and the front plate 3, 4. This plate produces a beam of parallel rays 22 which corresponds to the flat portion 3 of the said plate, and a beam of divergent rays 23 corresponding to the divergent lens portion 4: these divergent rays 23 produce sufficient lighting of the road in front and at the sides of the vehicle, whilst the beam 22 of practically parallel rays makes it possible to light the road to a great distance in front of the vehicle.

The concave reflector 14 collects the rays emitted by the lamp 9 and directed towards the rear of the vehicle, and reflects them forward, which ensures the strengthening of the beams 22 and 23. At the same time, the reflector 14 prevents the lamp 9 from illuminating the coloured glass 5 and from producing a coloured beam of light directed rearwards.

Finally, the opaque screen 20 covers the upper portion of the source of light 9 and prevents the said source from lighting the white glass 7 and from producing a beam of white light directed upwards.

In the event of the vehicle meeting another vehicle travelling in the opposite direction, the driver will exercise on the flexible cable 16 a pull in the direction 25, which will produce a rotation of the spindle 12 in the direction 26; the coloured screen 13, the reflector 14 and its opaque screen 20 will assume then the positions shown in dotted lines in Figure 2.

In these positions, the screen 13 arranged in front of the source of light 9 will intercept the beam of white light emitted by the said source, and transform it into a beam of coloured light which cannot exercise any dazzling effect on the driver of the vehicle coming in the opposite direction.

Moreover, the reflector 14 will be covered on this side, so that the beam of rays emitted rearwards by the lamp 9, will light the coloured glass 5 and produce a beam of coloured rays 28 directed rearwards, which will warn any drivers following, of the obstacle which they are about to meet, this beam of rays lights at the same time the road in front of the vehicles coming in the opposite direction.

At the same time, the opaque plate 20 is in its turn moved rearwards, so that the lamp 9 will strongly light the glass or lens 7 and produce a vertical beam 27 of white light which will clearly show the position of the vehicle to the drivers of any following vehicles or of those coming in the opposite direction.

As soon as the obstacle has disappeared, the driver ceases to exercise a pull in the direction 25 on the cable 16; the helical spring 17 cocked during the preceding movement, will automatically return the coloured screen 13, the reflector 14 and its plate 20 to their initial positions shown in full lines in Figure 2; the head lamp will begin again to give a beam of white light which will light properly in front of the vehicle.

In short, the devices forming the subject of the invention, make it possible, on the one hand, to avoid the formation of dazzling rays, and on the other hand, to warn the following drivers of any obstacles met, or of any changes in the direction of movements, these devices ensuring also the lighting of the road in front of the vehicles coming in the opposite direction.

For the sake of greater simplicity, with the assistance of Figures 1 to 3, has been described a head lamp or head light in which several of the characteristics of the invention has been assumed to be combined. Nevertheless, the invention covers not only these complex combinations, but also the various characteristics described. More particularly, the invention relates in a general way to a head lamp or head light characterized by the combination of a convex or concave divergent lens with another lens or optical system arranged in the ordinary manner in front of the head lamp or head light, whatever be the nature of the latter lens or optical system, and whatever be besides the type of the said head lamp or head light.

Figure 4 shows another head lamp according to the invention. This head lamp differs from that of Figure 1 to 3 only by the following points: The support 31 for the source of light, secured to the casing 1, has a sleeve 32 in which can be mounted, by means of a bayonet joint, an acetylene burner 33 provided with an inner conduit 34; this conduit opens into an olive 35 to which is branched a union 36 engaging on the other hand with a double olive 37 carried by the casing 1; in this way the supply of gas, for instance such as acetylene gas, to the burner 33 is ensured.

The construction described in the foregoing makes it possible instantaneously to remove the acetylene burner 33 and to replace it by an electric lamp 9 shown in dotted lines in Figure 4, in such a manner that the head lamp could be worked at will either by electricity or by means of any desired gas.

Claims:

1. In a head lamp for motor cars and other vehicles, the following combination: a casing; a source of light arranged in the said casing; a front optical system arranged in the casing in front of the said source of light; a rear optical system arranged in the casing at the back of the said source of light; a movable coloured screen mounted in the casing; a movable reflector mounted in the casing; control means operating simultaneously the coloured screen and the reflector, so as to hold the coloured screen away from the source of light, and the reflector between the said source and the rear optical system in the position for travelling along an unobstructed path, whilst when the vehicle meets an obstacle, these control means bring the coloured screen between the source and the front optical system whereby the movable reflector leaves free the rear portion of the source of light and thus enabling the said source to light the rear optical system and to give a warning rearwards to any following vehicles, whilst at the same time lighting the road to be followed by the vehicle coming from the opposite direction.

2. In a head lamp for motor cars and other vehicles, the following combination: a casing; a source of light arranged in the said casing; a front optical system arranged in the casing in front of the said source of light; a rear optical system arranged in the casing behind the said source of light; an upper optical system arranged in the casing above the source of light; a movable coloured screen mounted in the casing; a movable reflector mounted in the casing; an opaque screen carried by the said reflector and arranged above the same; means of control operating simultaneously the coloured screen, the reflector and the opaque screen carried by the said reflector, in such a manner as to keep the coloured screen away from the source of light, the reflector between the said source and the rear optical system and finally the opaque screen between the said source and the upper optical system, in the position for travelling along an un-obstructed path whilst if the vehicle meets an obstacle, these means of control bring the coloured screen between the source and the front optical system whereby the movable reflector leaves free the rear portion of the source of light and thereby enabling the said source to light the rear optical system and to give a warning rearwards to any following vehicles, whilst at the same time lighting the road which is to be followed by the vehicle coming in the opposite direction, the opaque screen leaving also free the upper portion of the source of light and thus enabling the said source to light the upper optical system and to give a warning in the upward direction to the other vehicles.

3. In a head lamp for motor cars and other vehicles, the following combination: a casing; a source of light arranged in the said casing; a front optical system arranged in the casing in front of the said source of light; a rear optical system arranged in the casing behind the said source of light; a rotatable spindle carried by the casing; a movable coloured screen secured to the said spindle; a movable reflector secured to the said spindle; means of control operating the rotatable spindle in such a manner that if the vehicle meets an obstacle, the spindle may be turned to bring the coloured screen between the source and the front optical system whereby the movable reflector leaves free the rear portion of the source of light and thus enabling the said source to light the rear optical system and to give a warning rearwards to the following vehicles, whilst at the same time lighting the road to be followed by the vehicle coming in the opposite direction; return means such as a spring acting on the rotatable spindle and tending to return it to such a position that the coloured screen is moved away from the source of light, the movable reflector being then interposed between the source of light and the rear optical system.

In testimony whereof I affix my signature.

GUSTAVE ALPHONSE MARIE LAMBLIN PARENT.